United States Patent [19]

Sketo

[11] Patent Number: 4,925,165

[45] Date of Patent: May 15, 1990

[54] STEERING STABILIZER

[76] Inventor: James L. Sketo, 117 Oakland Blvd., Stockbridge, Ga. 30281

[21] Appl. No.: 264,828

[22] Filed: Oct. 31, 1988

Related U.S. Application Data

[63] Continuation-in-part of Ser. No. 149,846, Jan. 29, 1988, Pat. No. 4,822,012.

[51] Int. Cl.$^5$ .................... F16F 13/00; F16F 1/00
[52] U.S. Cl. .................... 267/221; 267/150; 280/89; 280/90
[58] Field of Search .............. 280/89, 90, 94; 267/34, 267/150, 166, 170, 221, 225, 286, 291, 222; 74/582, 592; 16/52, 61, 63, 65, 72, 85, DIG. 10, DIG. 36

[56] References Cited

U.S. PATENT DOCUMENTS

| | | | |
|---|---|---|---|
| 2,753,587 | 7/1956 | Quinn | 16/66 |
| 2,822,567 | 2/1958 | McCreary | 16/85 X |
| 2,969,560 | 1/1961 | Pierie | 16/65 X |
| 3,980,315 | 9/1976 | Hefren | 280/94 |
| 4,406,473 | 9/1983 | Sexton | 267/225 X |
| 4,736,931 | 4/1988 | Christopherson | 267/34 |

Primary Examiner—Robert J. Oberleitner
Attorney, Agent, or Firm—Harry I. Leon

[57] ABSTRACT

A steering stabilizer is connected between a fixed point on a vehicle frame and a moving point in the steering linkage which connects the vehicle's steerable wheels to the steering gears. The stabilizer includes a single coil spring and two pairs of connecting rods. One of the pairs of rods is secured to the fixed point of the vehicle frame and the other pair is connected to the vehicle steering linkage. The rods have left and right arms positioned adjacent opposite ends of the spring so that the connecting rods can transmit movement of the steering linkage (relative to the fixed point) to the spring to compress the spring when the steering linkage moves both away from as well as towards the fixed point on the frame. The spring is dimensionally sized and the left and right arms are selectively spaced so that the stabilizer is self centering in the absence of external forces acting on the steering linkage. In a first embodiment, the left and right arms of the rods are connected to form a loop encircling circumferential portions of the coil spring, whereas in the second embodiment the left and right arms do not form such a loop in order to facilitate assembly of the stabilizer.

3 Claims, 5 Drawing Sheets

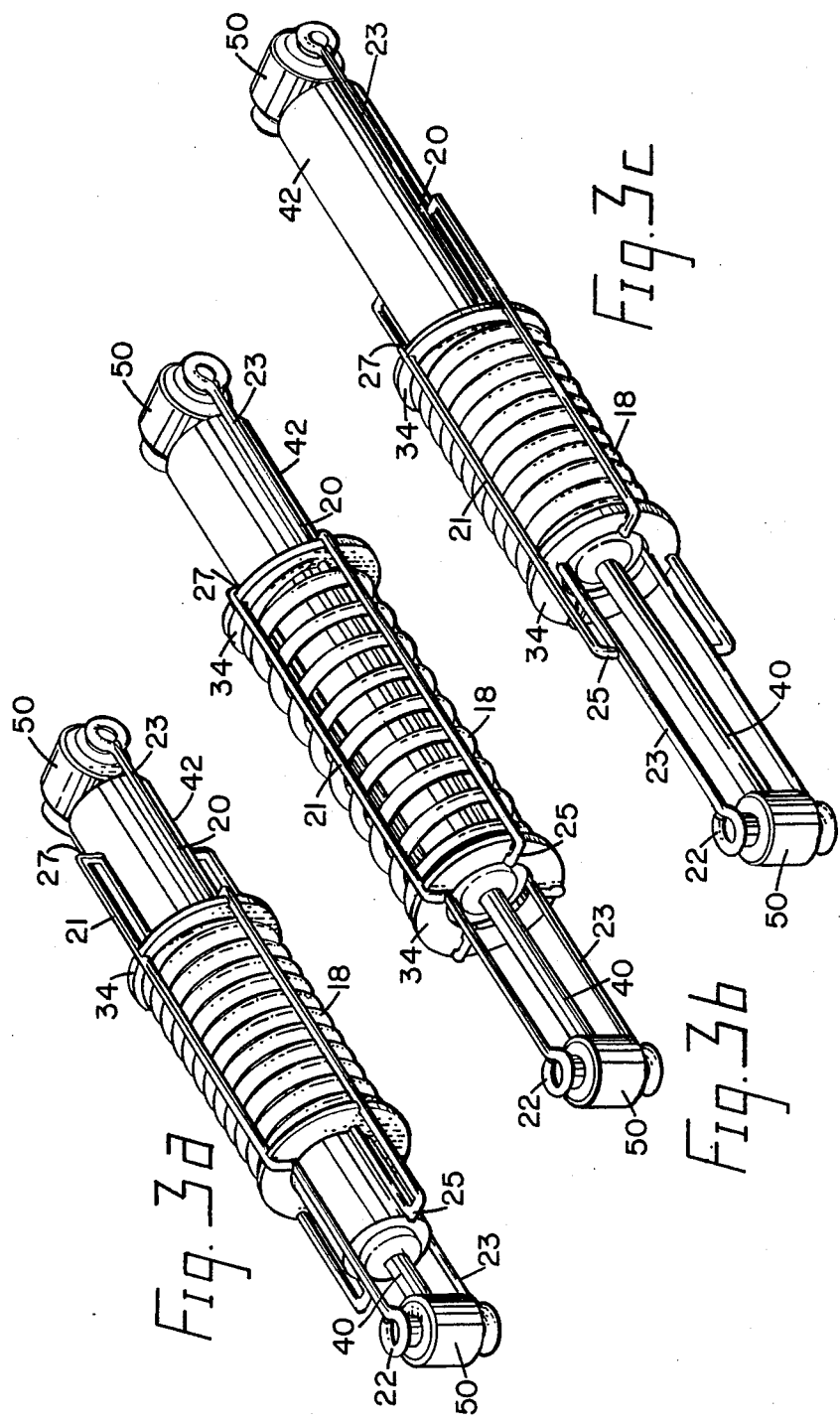

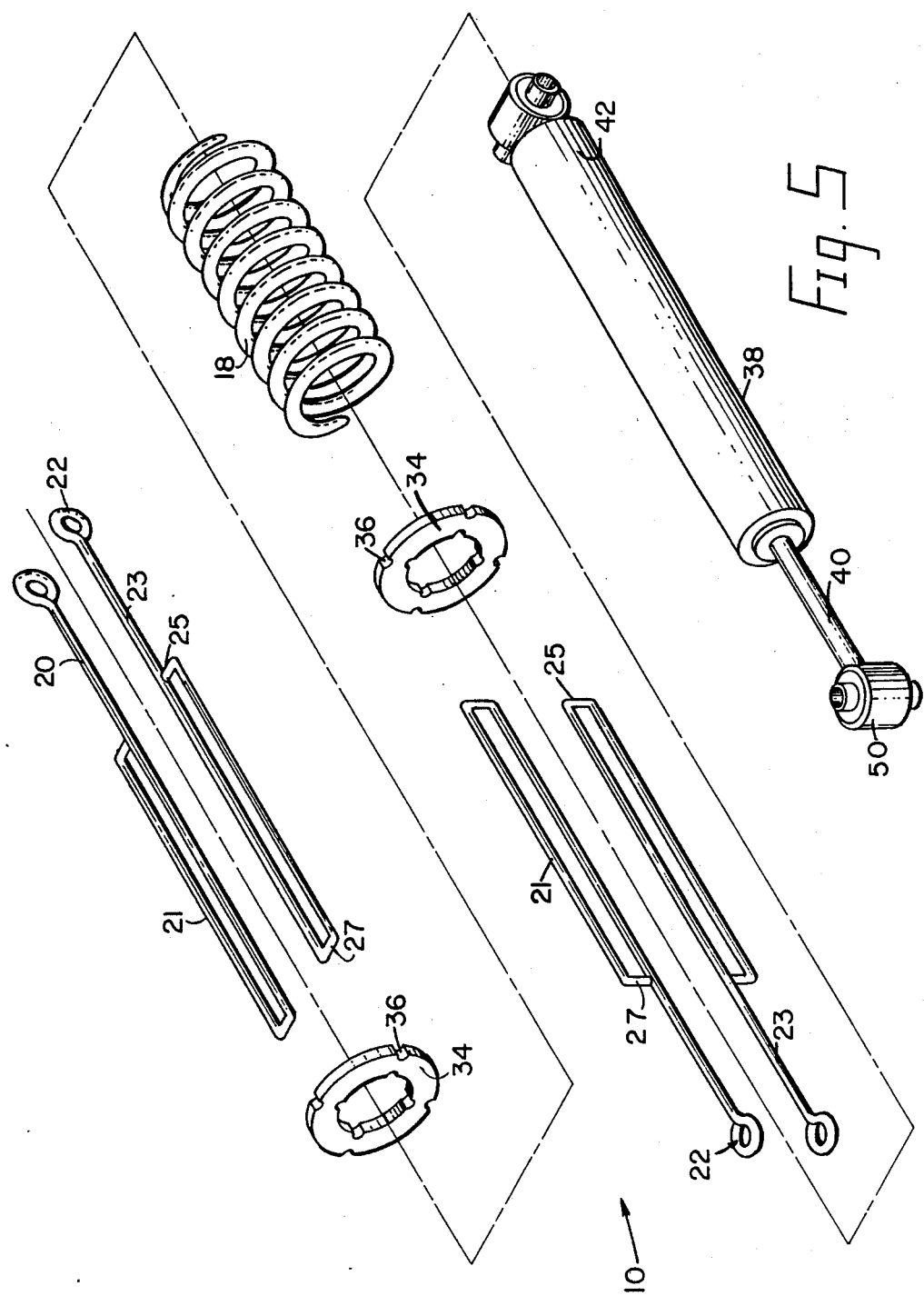

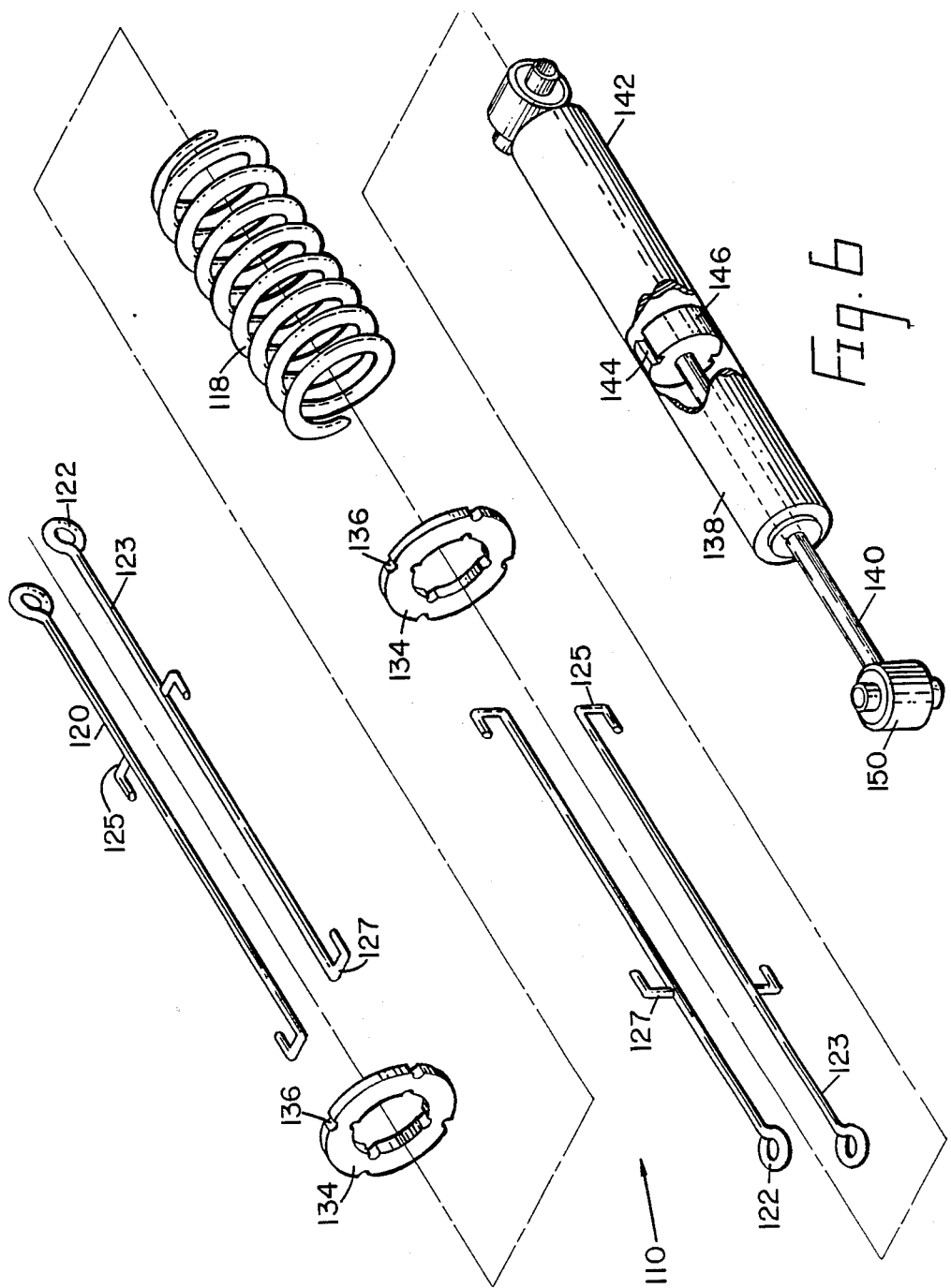

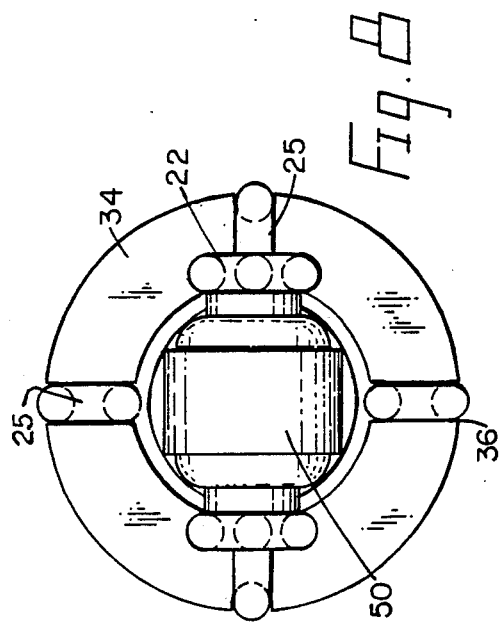
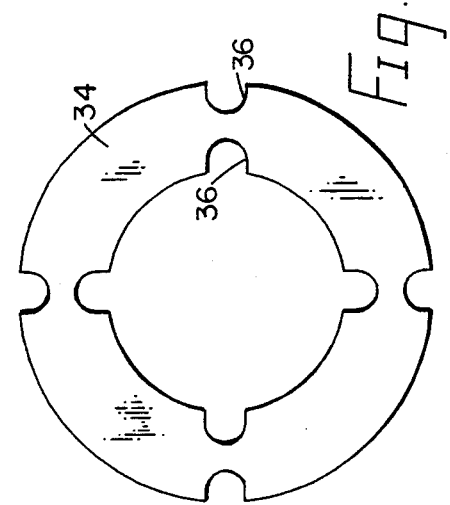
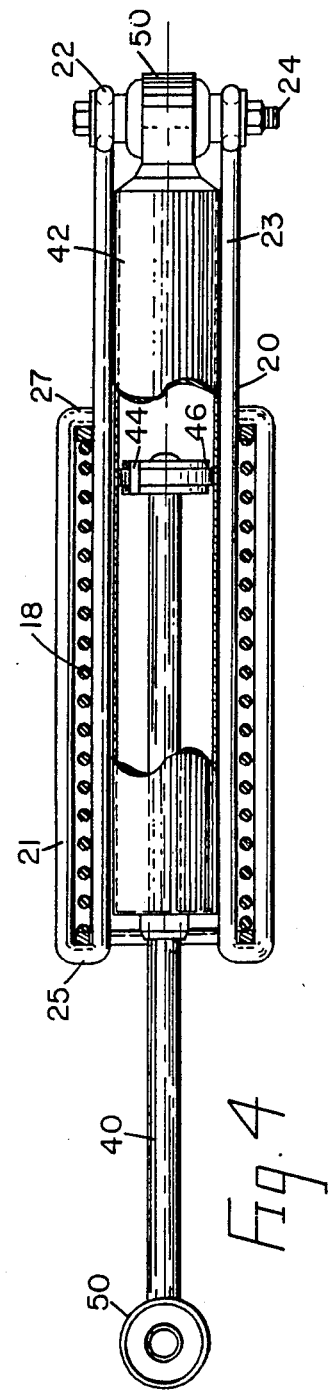

STEERING STABILIZER

CROSS-REFERENCE TO RELATED APPLICATION

This application is a continuation-in-part of application Ser. No. 149,846, filed Jan. 29, 1988, now U.S. Pat. No. 4,822,012.

BACKGROUND OF THE INVENTION

The present invention relates generally to stabilizers and more particularly to an improved stabilizer for use with vehicle steering mechanisms which is capable of being easily and inexpensively repaired.

Steering stabilizers are well known in the prior art and typically incorporate spring mechanisms which include fabricated rings welded to certain structural components of the device. Fabricated rings breaking loose from their welds due to the stresses and strains of the normal operation of the device have caused serious operational shortcomings and reduced the life expectancies of such prior art steering stabilizers. Prior art steering stabilizers in which the fabricated rings broke loose were typically discarded because dismantling the prior art unit in order to replace the fabricated parts and reweld them as needed was an inordinately time consuming process involving high labor cost.

Many prior art stabilizers have included threaded tension adjusters. Such stabilizers are generally unduly complicated as well as awkward and, thus, are not practical for use in modern automotive vehicles. In addition, such prior art stabilizers typically do not have a positive center point or a hydraulic damper to restrain excessive movement of the stabilizer. It is desirable that a stabilizer have a positive center point to which it is biased so that the stabilizer will tend to assume a desired neutral position when there are no external forces acting on it. This neutral position allows the vehicle steering system to resume or revert to a straight-ahead position when steering forces have been dissipated or removed.

One prior art device which does give a straight-ahead steering position by having a positive central bias is disclosed in U.S. Pat. No. 4,406,473 to Sexton. The Sexton device has a hydraulic damper and additionally includes two springs which are disposed in an opposing relationship and are of equal strength in order to allow the device to have a positive bias. The Sexton device has a central ring in between and abutting these two coil springs which receives the forces exerted by the springs. This ring is consequently susceptible to breakage because it is subjected to high forces during operation of the stabilizer. Since this ring is fixed within the device, repair of the stabilizer when breakage of the ring occurs would necessitate having to detach the ring from its mounting point on the device and to reattach a new ring by welding it to a structural part of the stabilizer. Additionally, since the ring is centrally located within the device, complete disassembly of the device is required in order to obtain sufficient access to the ring to perform the necessary repairs. Since the Sexton device is somewhat complicated, such repairs would be a labor intensive endeavor. For this reason, the Sexton device and other similar prior art devices are simply discarded when the ring breaks or when the hydraulic components malfunction or wear out. Consequently, a major disadvantage with such prior art devices is that they have to be discarded in the event of a breakage or other malfunction of the device. Since such prior art devices are generally somewhat complex and therefore expensive to replace, incorporation of such prior art devices in modern vehicle steering systems is unduly expensive when prorated over the lifetime of the vehicle.

A steering stabilizer is thus needed that is relatively simple in construction and thus inexpensive to manufacture. A steering stabilizer is also needed that is easily repairable and has fewer fabricated and welded parts at stress locations to reduce the likelihood that the stabilizer will sustain breakage of component parts resulting in stabilizer malfunction.

SUMMARY OF THE INVENTION

It is a principle object of the present invention to provide a stabilizer which can be easily dismantled and repaired.

It is another object of the present invention to provide a stabilizer which has a minimal number of parts susceptible to breakage or malfunction.

It is another object of the present invention to provide a stabilizer which is biased to have a center or neutral position.

It is another object of the invention to provide a stabilizer which is easily assembled so that it is inexpensive to manufacture.

It is also another object of the present invention to provide a stabilizer that is simple in construction so that it is inexpensive to manufacture and relatively trouble-free.

The stabilizer of the present invention, which may be used on a car, truck, boat or anywhere else a stabilizer is needed, is specifically designed to have no fabricated parts which are welded or otherwise secured to fixed points in the stabilizer's structural components, and which are consequently subject to high stresses resulting in their breakage. Since there is reduced likelihood of breakage of such component parts of the stabilizer, there is consequently a reduced likelihood that the unit will malfunction. In addition, since the stabilizer of the present invention has no fabricated parts which are welded to fixed points in the unit, the device is less expensive to manufacture and moreover is much easier to dismantle and repair.

The stabilizer of the invention has a coil spring, both ends of which are operatively connected by means of a pair of looped members to the frame or to a suitable fixed point on the vehicle. Another pair of looped members in a similar manner operatively connects both ends of the coil to the steering linkage of the vehicle. The spring biases the looped members so that in the absence of any external forces acting on the steering linkage, the looped members will have a desired relative position resulting in the steering linkage assuming a center or neutral position so that the vehicle, such as a car or boat, is in a straight-ahead steering position. When external forces are acting on the steering linkage (caused by steering maneuvers of the driver or conditions resulting in transmission of forces to the steering linkage) thereby producing movement of the connection points of the looped members such that the connection points come together or move further apart, the looped members in both instances act to compress the spring. Thus, when the external force is dissipated or removed, the force of the compressed spring will move the looped members back to a desired center or neutral position. Proper biasing of the looped members (and therefore the steering linkage) to a desired center or neutral position is accomplished by proper selection of the spacing of the arm portions of the looped members as well as the size and tension of the spring.

In a first embodiment, the looped member has a more or less generally straight rod portion having an eye at one end and a relatively large looped portion at the opposite end for retaining lateral portions of a spring therein. The looped portion has arm portions adjacent the spring ends. In this embodiment, the looped portion is manufactured so that it is open at one end. This allows the lateral portions of the spring to be inserted therein after which the looped portion is welded closed.

In a second embodiment, the rod has an eye at one end and two arms, one of which is positioned at the other end of the rod and the other of which is positioned generally at a medial portion of the rod. The arms are disposed so that they face each other. In this embodiment, the coil spring may be simply inserted between the arms with the rod portion generally positioned within the coil spring and with the inner surfaces of the arms adjacent the ends of the spring. Thus, the second embodiment allows easier and quicker assembly and disassembly of the unit.

In both embodiments, there is also preferably a pair of guide rings positioned between the arms and the coil ends. The guides are notched at selected portions thereof both in the inner portions and outer portions of the rings. In the second embodiment, inner surfaces of upper ends of the arms fit in the outer portion notches and upper surfaces of portions of the rods adjacent the arms fit in the inner portion notches. In the first embodiment, inner surfaces of upper and lower portions of the looped portions adjacent the arms fit in the notches. These looped member portions will thus move within the notch portions of the guide rings during convergent and divergent movement of the connection points (and rod eyes). The guide rings will thus be able to effectively guide movement of the looped portions, arms and the rods relative to the springs. Thus, the guides will prevent undesired movement of the rod, looped portions and arms around the circumference of the coil as well as cocking movement and radial movement (with reference to the coil spring) of the arms, looped portions and rods.

A hydraulic damper, preferably in the form of a hydraulic plunger and cylinder structure, may also be provided in order to restrain movement of the looped members (or rods) relative to each other. The damper thus prevents jolts and shocks and a variety or undesired external forces from being transmitted to the steering linkage.

It is also important to note that neither the members, the guide rings nor the coils need be fixed to a structural main body portion of the stabilizer, as in prior art devices. Consequently, there is no component that can break loose from its connection point, as in other prior art devices, thus causing the stabilizer to fail or malfunction. This also simplifies manufacture and assembly of the stabilizer of the present invention.

Optionally, the stabilizer may be provided with a cover in order to keep out dirt and other contaminants from the working portions of the stabilizer. This cover may be in the form of a simple cylindrical shell covering generally the coil spring and having rubber bellows shaped portions at its ends which cover the generally straight rod portions of the stabilizer.

BRIEF DESCRIPTION OF THE DRAWINGS

FIG. 3A is a perspective view of a first embodiment of the stabilizer of the present invention showing the positioning of the components thereof upon generally convergent movement of the looped member ends which result in compression of the spring.

FIG. 3B is a perspective view of a first embodiment of the stabilizer of the present invention showing the stabilizer in a generally neutral or center position with the spring ends abutting the arms of the looped members.

FIG. 3C is a perspective view of a first embodiment of the stabilizer of the present invention showing the positioning of the components thereof upon generally divergent movement of the looped member ends which also result in compression of the spring.

FIG. 4 is a central vertical longitudinal section view of a first embodiment of the stabilizer of the present invention.

FIG. 5 is a partially exploded view of the first embodiment of the present invention showing the looped members, guide rings and coil spring in greater detail.

FIG. 6 is a partially exploded view of a second embodiment of the present invention showing the looped members, the arms, the guide rings and the coils in greater detail.

FIG. 7 is a plan view (applicable to both embodiments) of the guide ring of the stabilizer of the present invention.

FIG. 8 is an end elevational view (also applicable to both embodiments) of the stabilizer of the present invention showing in detail the positioning and connections of the looped members.

DETAILED DESCRIPTION OF THE PREFERRED EMBODIMENT

Figure 1:
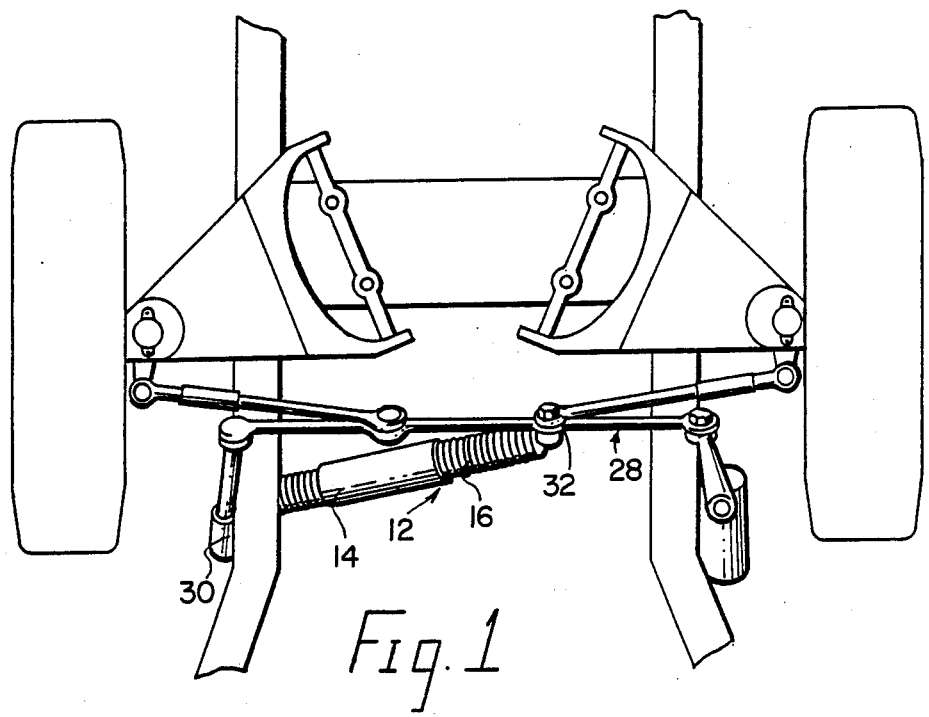
FIG. 1 is a top plan view of the stabilizer of the present invention illustrating its connection to the vehicle frame and vehicle steering linkage and additionally showing the stabilizer cover.
Figure 2:
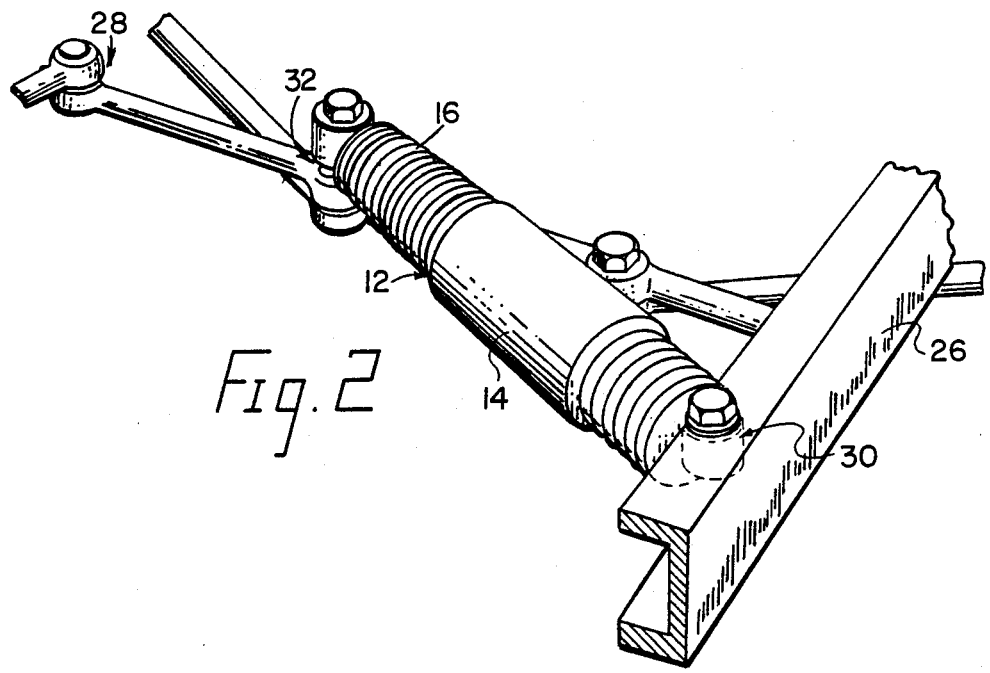
FIG. 2 is a perspective view of the stabilizer of the present invention illustrating in more detail its connection to the vehicle frame and vehicle steering linkage and additionally showing the stabilizer cover.

Referring now to the drawings, FIGS. 1, 3A-C, 4 and 5 show a first embodiment of the invention generally designated by the numeral 10. FIG. 1 shows the cover 12 of the stabilizer which essentially comprises a hollow cylinder 14 the ends of which are connected to bellows shaped rubber portions 16. Cover 12 protects the inner components of the stabilizer from dust and dirt to increase the stabilizer's longevity and prolong its trouble free operation.

FIGS. 3A-C show the spring 18 which is preferably a coil spring.

Looped members or connecting members or connecting rods 20 are provided which have looped portions 21 which curve around lateral portions of the coils of the spring 18 so as to generally encircle these portions, as shown in FIGS. 3A-C. Looped members 20 also have a generally straight rod portion 23. Looped members 20 also have an eye 22 at an end thereof. Eyes 22 are preferably dimensioned so that a bolt 24 can be inserted therethrough for attachment of looped members 20 to the vehicle frame 26 and the vehicle steering linkage 28, as shown in FIG. 1. There are preferably two pairs of looped members 20, one pair of which is preferably attached to the steering linkage 28 and the other pair of which is preferably attached to the frame 26. The looped members 20 are preferably generally identical in size and construction. However, looped members 20 are disposed so that the straight rod portions 23 of each pair extend in opposite directions to the rod portions 23 of the other pair, and they are preferably alternately positioned and preferably spaced 90 degrees apart radially with reference to the spring 18. Thus, looped members 20 are relatively positioned so that the external forces applied to the stabilizer 10 are transmitted to ends of the coil spring 18 at locations approximately 180 degrees apart in order to more evenly distribute these forces to the spring 18 for enhanced smooth operation of the stabilizer 10.

External forces (which may, for example, include the forces produced by the driver steering the vehicle and various road conditions) act on the frame and steering linkage so as to result in the attachment points of the stabilizer 10 to the vehicle frame and steering linkage either coming together by moving in a generally convergent directions or moving apart by moving in a generally divergent directions. Concomitantly, the ends of the looped members similarly tend to move in generally convergent directions or divergent directions as a result of such external forces. FIG. 3A shows the positioning of the component parts of the stabilizer 10 as a result of generally convergent movement of the eyes 22 and the steering linkage and fixed connection points 30 and 32. This results in medially located (with reference to connecting members 20) loop portions or left and right arms 25 and 27 of the looped members 20, which abut the coil spring ends, also moving in convergent directions against the spring ends thereby resulting in compression of the spring 18, as shown in FIG. 3A.

External forces acting on the steering linkage so as to move the eyes 22 of the looped members 20 in generally divergent directions result in general positioning of the components of the stabilizer 10 shown in FIG. 3C. When the eyes 22 of looped members or connecting members 20, move in generally divergent directions right arms 27 of one pair of members 20 and left arms 25 of the other pair of members 20 move in generally convergent directions so that the spring is again compressed. Since the spring 18 is compressed when external forces acting on the steering linkage result in the eyes 22 of the looped members 20 moving in both generally divergent as well as convergent directions, the force of the compressed spring 18 will move the eyes 22 of the looped members 20 to a generally neutral or center position when these external forces are dissipated or removed. The stabilizer 10 is depicted in this neutral or centered position in FIG. 3B. In the neutral position depicted in FIG. 3B, the left and right (or inner and outer) arms of the looped members 20 are shown generally abutting the ends of the coil springs 18. Consequently, in the neutral or center position, the vehicle has its steering linkage in such a position that the wheels are generally pointing straight-ahead. Thus, when the external forces are removed, the vehicle steering wheels return to a generally straight ahead position as desired in conventional automobiles.

There are preferably guides or guide rings 34 positioned at both ends of the coil springs and disposed between the longitudinal (or axial) ends of the coil springs 18 and the inner surfaces of the left and right (or inner and outer) arms of the looped members 20. Guides 34 guide movement of members 20 and arms 25 and 27 relative to spring 18. FIG. 4 shows the positioning of the guide rings 3 in relation to the coil springs 18 and the arms 25 and 27. Guide rings 34 will be described in greater detail below. FIG. 4 additionally shows the positioning of the connecting members or looped members 20 and the positioning of each one of the pairs of looped members 20. Each of the pair is spaced approximately 180 degrees apart from the other of the pair radially with reference to the spring 18. One of the pairs also is preferably connected to the vehicle frame 26 while the other pair is preferably connected to the steering linkage 28.

FIGS. 4 and 5 show a hydraulic damper 38 which preferably comprises a hydraulic plunger 40 and cylinder structure 42 although other suitable types of dampers may also be utilized. Holes 44 are provided in the disc 46 of the hydraulic plunger, as shown in FIG. 4, in order to allow a restricted flow of fluid therethrough from one chamber in the cylinder into the other chamber located at the opposite side of the hydraulic plunger disk 46. Preferably, the mounting bolts 24 go through the ends 50 of the hydraulic damper 38 as well as the eyes 22 of the looped members 20 thereby attaching both the looped members 20 and the hydraulic damper 38 together to the fixed point 30 on the vehicle frame and the vehicle steering linkage connection point 32, as desired.

FIG. 6 shows a second embodiment 110 of the invention similar to the first embodiment except that the looped or connecting members 120 do not have looped portions which completely encircle lateral portions of the coil spring 118. Instead, looped members 120 are provided with left arms 125 and right arms 127 (or inner arms and outer arms 125 and 127) integral with or firmly secured to the looped members 120. Left and right arms 125 and 127 are positioned adjacent to left and right longitudinal (or axial) ends, respectively, of spring 118 for operative engagement of arms 125 and 127 with these spring ends.

Right arm 127 of the one pair of members 120 is located at one end of the connecting member, and left arm 125 of the other pair of members 120 is located preferably at a medial portion of connecting member 120. Conversely, left arm 125 of the one pair of connecting members 120 is located at one end of the members 120, and right arm 127 of the other pair of members 120 is located at a medial portion of the members. Eyes 122 are located at the other ends of the connecting members 120. Thus, utilization of the arms 125 and 127, because lateral portions of the spring 118 are not completely encircled, allows the spring 118 to be easily inserted into and removed from the connecting members for assembly or repair. In contrast, in the first embodiment 10, preferably the inner arms are not connected to the member 20 (i.e. looped portions 21 are open at a portion thereof) prior to assembly in order to allow the spring 18 to be inserted into the looped portions 21; thus, in the first embodiment, inner arms are welded or otherwise secured to the members 20 (to close looped portions 21) after insertion of the spring 18 into the looped portion 21. FIG. 6 also illustrates the guide ring 134 and notches 136 which guide movement of the spring 118 relative to the arms 125 and 127 and connecting members 120. The members 120 have straight portions 123 and are preferably paired, as in embodiment 10, with members 120 spaced 90 degrees apart axially with reference to the spring 118. A hydraulic damper 138 includes a plunger 140 and cylinder structure 142 and has holes 144 in a plunger disc 146, as in the damper 38 of embodiment 10 and for the same purpose. The eyes 122 and damper ends 150 are preferably connected to the vehicle frame and steering linkage, as in embodiment 10.

FIG. 7 shows in greater detail the guide ring 34 and the notches 36 therein. FIG. 8 also shows the guide ring in more detail as well as the fitting of the curved portion of the arms and the straight portion of the connecting rods in the notches 36 as well as the positioning of the eyes of the looped members in relation to the ends of the hydraulic damper. The notches 36 guide movement of the looped portions 21 relative to the spring and relative to the other looped portions and retain the looped members 20 and spring 18 in a desired relative position. Since the function and structural relationship of the guide rings to the other stabilizer components are preferably essentially the same for both the first and second embodiments, FIG. 7 and FIG. 8 are numbered for only the first embodiment in order to simplify the depiction of the relationship of the guide rings to the other component parts of the stabilizer. In addition, since the guide rings are preferably essentially identical in both embodiments, another otherwise basically identical set of figures for the second embodiment has not been included in order to avoid undue duplicity.

Accordingly, there has been provided, in accordance with the invention, a stabilizer which is relatively simple in construction and therefore more troublefree and easier to dismantle and repair. It is to be understood that all the terms used herein are descriptive rather than limiting. Although the invention has been described in conjunction with the specific embodiments set forth above, many alternative embodiments, modifications and variations will be apparent to those skilled in the art in light of the disclosure set forth herein. Accordingly, it is intended to include all such alternatives, embodiments, modifications, and variations that fall within the spirit and scope of the invention as set forth in the claims hereinbelow.

What is claimed is:

1. In a stabilizer for connection between a fixed portion of a vehicle and a movable portion of a vehicle steering linkage, the stabilizer having a cylinder, the improvement comprising:
   (a) a compression spring of sufficient inner diameter for receiving the cylinder longitudinally;
   (b) two sets of looped members, each looped member having an elongated loop and a connecting rod; the looped members encircling portions of the spring; the elongated loop having inner and outer arms disposed approximately parallel to each other, portions of the inner arms being disposed between the cylinder and the spring; the connecting rods extending longitudinally from the inner arm of each looped member; the rods of the first set of looped members being pivotally connected to the fixed portion of the vehicle, the rods of the second set of looped members being pivotally connected to the movable portion of the vehicle steering linkage;
   (c) first and second slideable guide rings positioned contiguous opposite ends of the spring, each guide ring comprising an annular body with a plurality of pairs of notches formed in the inner and outer peripheral edges of said body; the notches in each pair being disposed radially with respect to each other, the space between the inner and outer arms of each looped member being approximately equal to the distance between the notches in each pair; both the first and second guide rings having the same number of pairs of notches; the distance between contiguous pairs of notches along said inner peripheral edges being approximately equal; the inner and outer arms of each looped member being slideable within a pair of notches in each of the guide rings;
   (d) first means disposed proximate the first and second guide rings on the sides thereof away from the spring and connecting the inner and outer arms of each looped member of the first set for limiting the travel of the opposite ends of the spring;
   (e) second means disposed proximate the first and second guide rings on the sides thereof away from the spring and connecting the inner and outer arms of each looped member of the second set for limiting the travel of the opposite ends of the spring; opposite ends of the spring simultaneously forcing the first guide ring against the first limiting means and the second guide ring against the second limiting means when the fixed portion of the vehicle and the movable portion of the vehicle steering linkage come together by moving in generally convergent directions; opposite ends of the spring simultaneously forcing the second guide ring against the first limiting means and the first guide ring against the second limiting means when the fixed portion of the vehicle and the movable portion of vehicle steering linkage move apart by moving in generally divergent directions, so that the steering linkage assumes a desired neutral position relative to the fixed portion of the vehicle upon the removal of external forces acting on the steering linkage.

2. In a stabilizer for connection between a fixed portion of a vehicle and a movable portion of a vehicle steering linkage, the stabilizer having a cylinder, the improvement comprising:
   (a) a compression spring of sufficient inner diameter to receive the cylinder longitudinally;
   (b) two sets of connecting members, each connecting member including a rod, the rods of the connecting members being disposed approximately parallel to each other, a straight portion of each rod in the first set and in the second set being disposed between the cylinder and the spring and extending longitudinally from a first end and from a second end, respectively, of the spring; the rods of the first set of connecting members being pivotally connected to the fixed portion of the vehicle, the rods of the second set of connecting members being pivotally connected to the movable portion of the vehicle steering linkage;
   (c) first and second slideable guide rings positioned contiguous opposite ends of the spring, each ring comprising an annular body with a plurality of notches formed in the inner peripheral edge thereof; both the first and the second guide rings having the same number of notches; the distance between contiguous pairs of notches along said inner peripheral edges being approximately equal; the straight portion of each rod being slideable within a in the inner peripheral edge of each guide ring;
   (d) first means disposed proximate the first and second guide rings on the sides thereof away from the spring for limiting the travel of the opposite ends of the spring; the first limiting means including a pair of protrusions which extend perpendicularly from each rod of the first set;

(e) second means disposed proximate the first and second guide rings on the sides thereof away from the spring for limiting the travel of the opposite ends of the spring; the second limiting means including a pair of protrusions which extend perpendicularly from each rod of the second set; opposite ends of the spring simultaneously forcing the first guide ring against the first limiting means and the second guide ring against the second limiting means when the fixed portion of the vehicle and the movable portion of the vehicle steering linkage come together by moving in generally convergent directions, opposite ends of the spring simultaneously forcing the second guide ring against the first limiting means and the first guide ring against the second limiting means when the fixed portion of the vehicle and the movable portion of the vehicle steering linkage move apart by moving in generally divergent directions, so the steering linkage assumes a desired neutral position relative to the fixed portion of the vehicle upon the removal of external forces acting on the steering linkage.

3. A stabilizer as claimed in claim 2 wherein the cylinder is filled with fluid and wherein said stabilizer further comprises a piston having fluid restrictor through-ports mounted within said cylinder and movable relative thereto and a piston rod attached at one end to said piston and extending through said open end of the cylinder with the distal end of said piston rod being affixed to said vehicle steering linkage whereby the piston moves through the fluid with resistance as the looped members move longitudinally relative to the cylinder.

* * * * *